(12) United States Patent
Borean et al.

(10) Patent No.: US 8,321,171 B2
(45) Date of Patent: Nov. 27, 2012

(54) SENSOR NETWORK INCLUDING SPATIALLY DISTRIBUTED SENSOR NODES IN AN AREA FOR DETECTION OF MOBILE ENTITIES IN THE AREA

(75) Inventors: Claudio Borean, Turin (IT); Valter Bella, Turin (IT); Roberta Giannantonio, Turin (IT)

(73) Assignee: Telecom Italia S.p.A., Milan (IT)

( * ) Notice: Subject to any disclaimer, the term of this patent is extended or adjusted under 35 U.S.C. 154(b) by 536 days.

(21) Appl. No.: 12/448,200

(22) PCT Filed: Dec. 13, 2006

(86) PCT No.: PCT/EP2006/011987
§ 371 (c)(1),
(2), (4) Date: Dec. 23, 2009

(87) PCT Pub. No.: WO2008/071209
PCT Pub. Date: Jun. 19, 2008

(65) Prior Publication Data
US 2010/0094583 A1    Apr. 15, 2010

(51) Int. Cl.
*G06F 17/00* (2006.01)
*G06F 17/40* (2006.01)

(52) U.S. Cl. ......... 702/142; 702/149; 702/188; 340/928
(58) Field of Classification Search ........................ None
See application file for complete search history.

(56) References Cited

U.S. PATENT DOCUMENTS

| 7,484,008 | B1* | 1/2009 | Gelvin et al. | 709/249 |
|---|---|---|---|---|
| 7,555,384 | B2* | 6/2009 | Nishida | 701/469 |
| 2002/0004741 | A1 | 1/2002 | Yoshida | |
| 2003/0001755 | A1* | 1/2003 | Tiernay et al. | 340/928 |
| 2004/0240322 | A1 | 12/2004 | Szajnowski | |
| 2005/0138200 | A1* | 6/2005 | Liu et al. | 709/238 |
| 2005/0255864 | A1 | 11/2005 | Kent et al. | |
| 2005/0270175 | A1 | 12/2005 | Peddie et al. | |
| 2006/0015503 | A1 | 1/2006 | Simons et al. | |
| 2006/0227664 | A1 | 10/2006 | Horak | |
| 2007/0174467 | A1* | 7/2007 | Ballou et al. | 709/227 |

FOREIGN PATENT DOCUMENTS

| EP | 1 464 988 B1 | 6/2008 |
|---|---|---|
| WO | WO 01/26335 A2 | 4/2001 |

* cited by examiner

*Primary Examiner* — Hal Wachsman
(74) *Attorney, Agent, or Firm* — Finnegan, Henderson, Farbow, Garrett & Dunner, L.L.P.

(57) ABSTRACT

A system includes a plurality of networked nodes spatially distributed within a monitored area and adapted to interact with a mobile entity entering and moving through the area, the plurality of nodes including at least one area entrance node adapted to detect the mobile entity upon entering the monitored area, and a transaction node for accomplishing a transaction with the mobile entity; a transaction processing center in communication relationship with the nodes for processing data required for the transaction and for providing the data to the transaction node. A node selection unit is adapted to dynamically select the transaction node among the plurality of nodes based on an estimation of the speed of movement of the mobile entity.

18 Claims, 7 Drawing Sheets

SENSOR NETWORK INCLUDING SPATIALLY DISTRIBUTED SENSOR NODES IN AN AREA FOR DETECTION OF MOBILE ENTITIES IN THE AREA

CROSS REFERENCE TO RELATED APPLICATION

This application is a national phase application based on PCT/EP2006/011987, filed Dec. 13, 2006, the content of which is incorporated herein by reference.

FIELD OF THE INVENTION

The present invention relates to sensor networks and, more specifically, to sensor networks including sensor nodes spatially distributed in a given area supporting mobile sensor nodes entering the area.

DESCRIPTION OF THE RELATED ART

Several commercial sensor technologies are known that are related to sensor networks, including some combination of sensing, remote signal processing, and communications.

The advances in integrated circuit technology have enabled construction of far more capable sensors, radios, and processors at low cost, thereby enabling the mass production of sophisticated systems that link the physical world to networks.

Sensor networks may exhibit both wireless and wired communications capabilities, using a common protocol; the flexibility of the design of the sensor networks enables a wide variety of applications, such as wireless mode vehicular applications. An exemplary application of sensor networks is in the "smart" management of the vehicles mobility, regarding safety, environment and economy. Sensor networks of this kind are called Intelligent Transport Systems (ITSs), and, by combining information technology and telecommunications, are capable of managing traffic-related information (for example, the number of vehicles in a given area, such as a parking area or a highway) and transactions related to the vehicles' mobility (for example, toll collection at the entrance/exit of a parking area and of a highway).

Many sensor networks have been proposed, with different features and architectures, adapted to satisfy the requirements of the different applications.

For example, WO 0126335 discloses a method for distributed signal processing in a distributed network. The method comprises monitoring an environment by a plurality of sensor nodes receiving a plurality of signals from the environment. At least one user remotely accesses at least one sensor node of the plurality of sensor nodes by programming using at least one application program interface such that the at least one remote user accesses node processes running below an operating system of the at least one sensor node.

US 2005270175 describes a traffic visual indicator device for mounting to a surface of a road. The traffic visual indicator device comprises a housing, a power producing source carried by the housing and operable to produce electrical power from energy derived from a source of energy externally located with respect to the traffic visual indicator device, an illumination source carried by the housing and positioned to transmit light out from the housing toward the traffic, a circuit carried by the housing, selectively coupling the power producing source and the illumination source, and a wireless communications subsystem carried by the housing and operable to at least receive wireless communications from an external source remotely spaced from the housing.

US 2002004741 and US 2003001755 relate to automatic toll collection systems designed to automatically collect tolls through radio communication. In particular, US 2002004741 discloses a system for automatic collection of tolls from a vehicle moving along a roadway, comprising a toll collecting facility, installed on the roadway, collecting the tolls from an in-vehicle unit installed in the vehicle through radio communication with the in-vehicle unit, and an inspecting facility inspecting the in-vehicle unit when an abnormal condition in which it is impossible to collect the tolls from the in-vehicle unit correctly is encountered, the inspecting facility being located outside the roadway. US 2003001755 discloses an apparatus for collecting vehicle tolls in a toll collection environment having an upstream roadway wide area which leads to a downstream plurality of individual lanes. The apparatus comprises a transponder for location in a vehicle entering the upstream roadway wide area, at least one first reader adapted to communicate with the transponder in the wide area, at least one second reader adapted to communicate with the transponder in an individual lane downstream from the wide area, transaction means connected to the first reader responsive to communication with the transponder to calculate a toll associated with the transponder, means for transmitting toll payment status information from the transponder to the first reader, and means associated with the second reader for signaling the payment of a toll.

US 2005255864 and US 2006015503 disclose methods of localizing a portable device through a wireless system. Particularly, US 2005255864 discloses a wireless position estimation method, comprising: statistically filtering time of flight information resulting from replies to queries to produce a plurality of range measurements, and calculating a position estimate as a result of processing a predetermined collected number of filtered the range measurements. US 2006015503 describes a method for opportunistically tracking the location of a portable device in a wireless infrastructure comprising at least one fixed station operable to communicate wirelessly with the portable device; the portable device provides its unique device identifier to the station when within communication range of the station; association data are generated, comprising the unique identifier with the location of the station, and the associated data are uploaded via a backchannel to a remote database wherein the data is stored.

SUMMARY OF THE INVENTION

The Applicant has observed that while it would be desirable to deploy sensor networks made up of low-cost sensor nodes, of relatively short radio range and low communications throughput, these sensor networks may be unsuitable for the management of vehicular traffic, like for example for the automatic toll collection. Indeed, considering a sensor network including a plurality of sensor nodes distributed, for example, along a highway, where the vehicles move with a relatively high speed, the radio range of the sensor nodes may easily result limited compared to a distance run by a vehicle in the time necessary for example for completing the toll payment transaction with a remote service center.

A similar problem is encountered in general whenever a sensor network is intended to interact with mobile units that move at a non-negligible speed within an environment monitored by a sensor network, like a parking area.

In view of the state of the art outlined in the foregoing, as the Applicant has tackled the problem of providing a method of operation of a sensor network configured to dynamically configure itself for a transaction in accordance with a speed of a mobile unit in respect of which the transaction is to be carried out, and with an inherent operation time delay of the sensor network.

The Applicant has found that the above problem can be solved provided that, based on the speed of the mobile unit, a forecast is made of which node of the sensor network will have to accomplish the transaction, and that node is selected for carrying out the transaction with the mobile unit.

According to an aspect of the present invention, a system is provided comprising:

a plurality of networked nodes spatially distributed within a monitored area and adapted to interact with a mobile entity entering and moving through the area, the plurality of nodes including at least one area entrance node adapted to detect the mobile entity upon entering the monitored area, and a transaction node for accomplishing a transaction with the mobile entity;

a transaction processing center in communication relationship with the nodes for processing data required for the transaction and for providing the data to the transaction node.

A node selection unit is provided, adapted to dynamically selecting the transaction node among the plurality of nodes based on an estimation of the speed of movement of the mobile entity.

According to another aspect of the present invention, a method is further provided of operating of a network of a plurality of sensor nodes spatially distributed within a monitored area and adapted to interact with a mobile entity entering the monitored area to accomplish a transaction, the method including:

having at least one entrance node of the plurality of sensor nodes detecting the entrance of the mobile entity in the monitored area;

estimating a speed of movement of the mobile entity; and dynamically selecting a transaction completing node among the plurality of sensor nodes based on the estimated speed.

It is pointed out that, for the purposes of the present description and claims, by "sensor network", "Wireless Sensor Network" (WSN), or "Wireless Sensor and Actuator Network" (WSAN) it is intended a network, made up of a plurality of (two or more) nodes configured to communicate with each other, and where the generic one of the network nodes may or may not be equipped with a sensor (and an actuator). Thus, the terms "sensor network", WSN, WSAN are not to be construed as limited to networks made up of nodes equipped with sensors.

BRIEF DESCRIPTION OF THE DRAWINGS

The features and the advantages of the present invention will be made apparent by the following detailed description of a preferred embodiment thereof, provided merely by way of non-limitative example, description that will be conducted making reference to the attached figures, in which.

DETAILED DESCRIPTION OF THE PREFERRED EMBODIMENT

Figure 1:
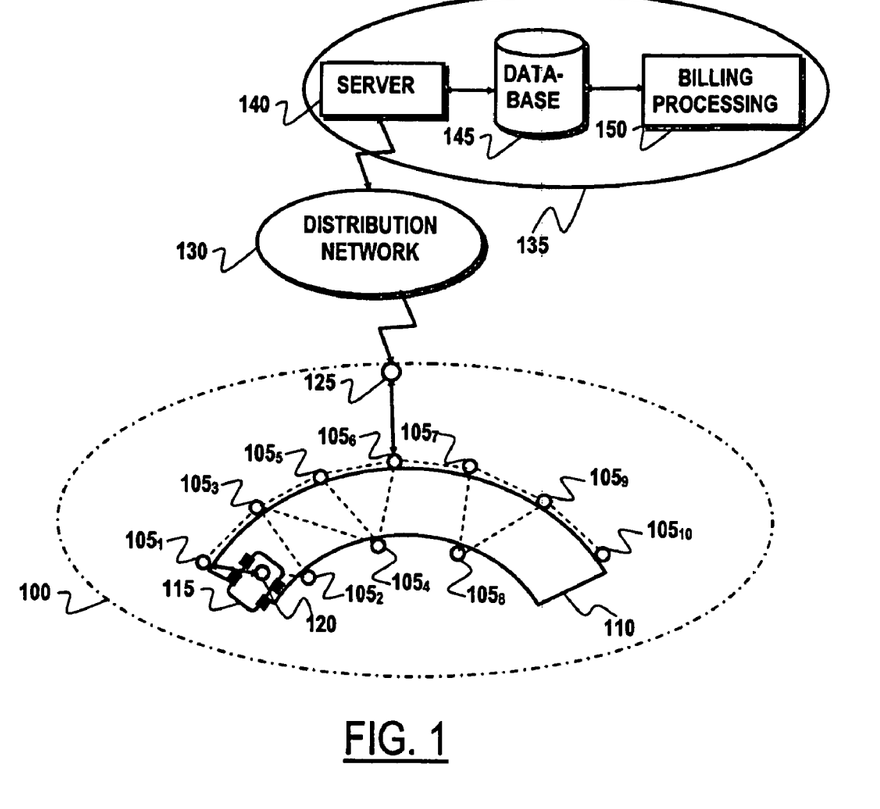
FIG. 1 schematically depicts a sensor network according to an embodiment of the present invention, particularly a sensor network for electronic toll collection.

With reference to the drawings, in particular to FIG. 1, a sensor network according to an embodiment of the present invention is shown, denoted globally with reference numeral 100, particularly a sensor network for electronic toll collection.

The sensor network 100 is, in the non-limitative example herein considered, a Wireless Sensor Network Network (hereinafter shortly referred to as WSN), or equivalently a Wireless Sensor and Actuator Network (WSAN), including a number N of fixed sensor nodes $105_1$-$105_N$ (ten, in the example shown in the drawing), spatially distributed, in respective, fixed positions, across a selected area, for example along a road 110, as depicted in the drawing, e.g. a highway or an access/exit lane or ramp of a highway, particularly along an acceleration or a deceleration lane of the highway 110. The fixed sensor nodes $105_1$-$105_N$ are for example, but not necessarily, uniformly spaced apart from each other of about 10 m.

The fixed sensor nodes $105_1$-$105_N$ are devices equipped with a telecommunication system. The specific type of telecommunication system adopted for the sensor nodes of the sensor network 100 is not limitative to the present invention, however a suitable telecommunication system is the known ZigBee™ system, standardized by the ZigBee Alliance. As known to those skilled in the art, ZigBee™ is a standard specification for a suite of high-level communication protocols using small, low-power digital radio interfaces.

Particularly, in an embodiment of the present invention, each fixed sensor node $105_1$-$105_N$ includes a respective transceiver compliant to the ZigBee™ communication standard, which operates at a radio frequency of 2.45 GHz with a relatively low bit rate (250 kbit/s) within a short radio range, limited to about 100 m. Advantageously, the ZigBee™ transceivers are low-power and low-cost devices, that auto-configure at set up, by acquiring a respective network address within the WSN 100; thus, the fixed sensor nodes $105_1$-$105_N$ are adapted to form an ad-hoc network. Preferably, the fixed sensor nodes $105_1$-$105_N$ are adapted to fall asleep, entering a very low power consumption mode, when they are inoperative, thus lowering their duty cycle and extending their battery life, as described in greater detail in the following.

A vehicle 115 moving along the lane of the highway 110 and carrying a mobile sensor node 120 adapted to communicate with the fixed sensor nodes $105_1$-$105_N$, for example compliant to the ZigBee™ communication standard, can connect to the sensor network formed by the fixed sensor nodes $105_1$-$105_N$.

When a mobile sensor node, like the mobile sensor node 120, carried by the vehicle 115, enters the radio coverage area of the sensor network formed by the fixed sensor nodes $105_i$-$105_N$, the mobile sensor node is "locked" by the WSN 100, that assigns a network address thereto.

As mentioned in the foregoing, the fixed sensor nodes $105_1$-$105_N$, albeit having a limited radio range, are adapted to form an ad-hoc network. The WSN 100 is thus a multi-hop wireless network, adapted to ensure a relatively wide radio coverage, wider than the radio coverage of the single sensor node, by multiple hopping over multiple, relatively short wireless links each one corresponding to the distance between two adjacent fixed sensor nodes, as illustrated in the drawing by dashed lines connecting pairs of fixed sensor nodes $105_1$-$105_N$; accordingly, the fixed sensor nodes $105_1$-$105_N$ not only act as application endpoints of the WSN 100, but also as routers, forwarding RF signals in broadcast.

The WSN 100 also includes a gateway node 125 that is adapted to act as an interface between the WSN 100 and a distribution network 130.

The distribution network 130 is a communication network, that may include one or more of a wireless communication network, e.g. a mobile telephony network, and a wireline telephony network.

The distribution network allows the WSN 100 communicating with a remote service center 135, which manages the provisioning to customers of the services the WSN 100 is deployed for, as well as the security and the authentication of the fixed and mobile sensor nodes $105_1$-$105_N$ and 120 and the access to data required for the application. In detail, the service center 135 comprises a server 140, connected to the distribution network 130 and thus in communication relationship with the WSN 100, through the gateway 125. The server 140 can access a database 145 storing data related to the fixed and mobile sensor nodes $105_1$-$105_N$ and 120 and to the services to be provided to the customers. In addition, the service center 135 may include a billing processing module 150, which, in the exemplary embodiment herein considered, is adapted to processing the data required to accomplish the toll collection.

Figure 2:
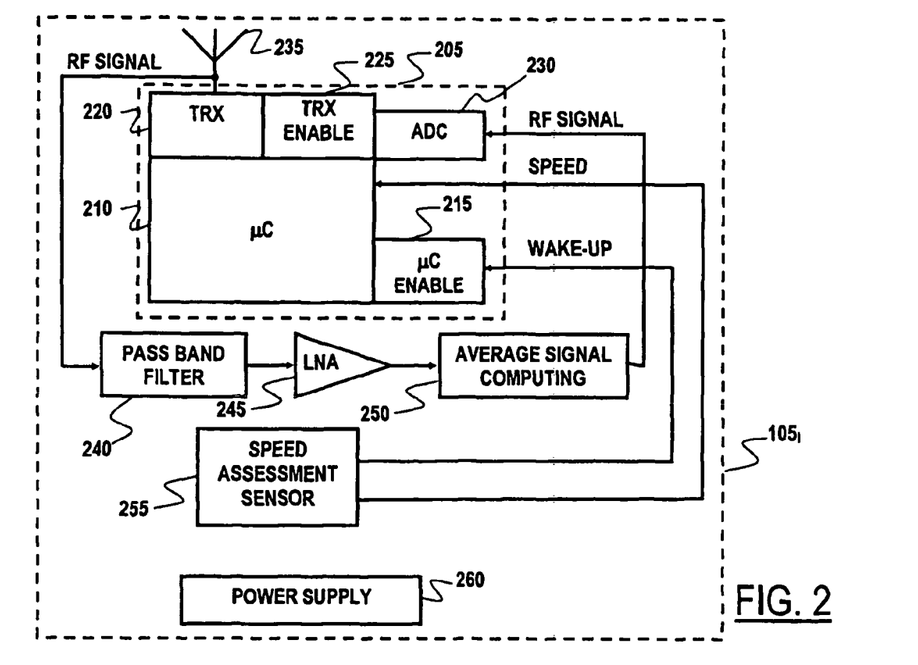
FIG. 2 schematically shows a fixed, wireless sensor node included in the sensor network of FIG. 1, in terms of the functional blocks relevant to the understanding of the invention embodiment to be described.

Considering FIG. 2, a fixed wireless sensor node $105_i$ (i is an index taking values between 1 and N) of the WSN 100 is schematically shown, in terms of the functional blocks relevant to the understanding of the invention embodiment to be described.

The fixed sensor node $105_i$ includes a WSN unit 205, for example, albeit not limitatively, an Integrated Circuit (IC) chip in which a microcontroller (μC) 210 and a μC enable module 215 are integrated. Furthermore, the WSN unit 205 includes a ZigBee transceiver (TRX) 220 and a TRX enable module 225, and an Analog-to-Digital Converter (ADC) 230 (in alternative embodiments of the invention, one or more of the μC 210, the μC enable module 215, the TRX 220, the TRX enable module 225, and the ADC 230 may be discrete components, instead of being integrated on a same chip).

The TRX 220 is coupled to an antenna 235 for the reception and the transmission of radio frequency (RF) analog signals. In turn, the antenna 235 is connected to a filter 240, particularly a pass band filter of the fixed wireless sensor node $105_i$, for example a filter having a pass band centered around about 2.4 GHz, for filtering the received RF signal; the output of the filter 240 is coupled to a Low-Noise Amplifier (LNA) 245. The output of the LNA 245 is coupled to an average signal computing module 250, adapted to evaluate an average power value of the received, filtered and amplified RF signal. The output of the average signal computing module 250 is coupled to the ADC 230.

The fixed sensor node $105_i$ further includes a speed assessment sensor 255, adapted to detect the speed of the vehicle 115 entering the area where the WSN 100 is deployed. The speed assessment sensor 255, for example, exploits the Doppler effect, by means of a microwave detector for estimating the speed of the vehicle 115 in module and direction. The speed assessment sensor 255 is adapted to provide to the microcontroller 210 data denoted in the drawing by the reference SPEED which correspond to the estimated vehicle speed, and also to provide a wake-up signal WAKE-UP to the microcontroller enable module 215, adapted to wake the microcontroller up (the wake-up signal WAKE-UP may for example be provided to an interrupt input of the microcontroller).

It is pointed out that the speed assessment sensor 255 need not be present on every fixed sensor node, being sufficient that it is provided in the first fixed sensor node of the WSN 100 that a vehicle meets when it enters the area covered by the WSN 100 moving along the highway 110, such as the fixed sensor node $105_1$. Also, the speed assessment sensor might be a component external to the fixed sensor node $105_i$, being coupled to it for providing the indication of the estimated vehicle speed, and the wake-up signal.

A power supply 260, for example a battery (e.g., a couple of AAA batteries) supplies the fixed sensor node $105_i$; particularly, the power supply 260 supplies the speed assessment sensor 255 and the WSN chip 205.

Figure 3:
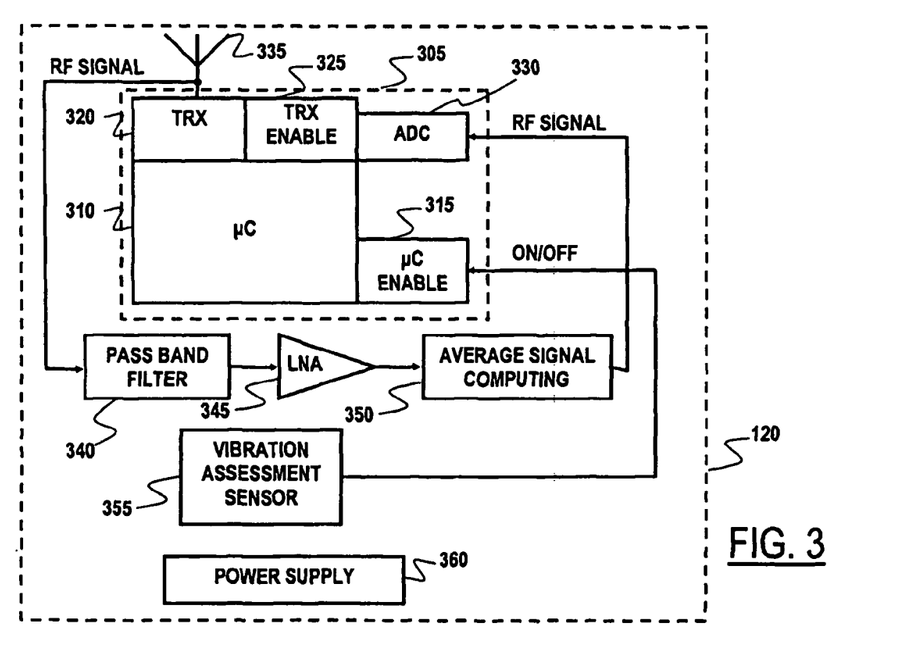
FIG. 3 schematically shows a mobile wireless sensor node, intended to be installed aboard a vehicle and adapted to interact with the sensor network of FIG. 1, in terms of the functional blocks relevant to the understanding of the invention embodiment to be described.

Referring now to FIG. 3, the structure of the mobile wireless sensor node 120 carried by the vehicle 115 is schematically shown, in terms of the functional blocks relevant to the understanding of the invention embodiment to be described.

Similarly to the fixed sensor nodes $105_i$, the mobile sensor node 120 includes a WSN unit 305, for example an IC chip where a μC 310 and a μC enable module 315 are integrated, together with a ZigBee TRX 320, a TRX enable module 325 and an ADC 330.

The TRX 320 is coupled to an antenna 335 for the reception and the transmission of RF signals; the antenna 335 is connected to a filter 340, particularly a pass band filter (similar to the pass band filter 240 in the fixed sensor node) for filtering the received RF signal. The output of the filter 340 is coupled to an LNA 345 adapted to amplify the filtered RF signal. The output of the LNA 345 is coupled to an average signal computing module 350, adapted to evaluate the average power value of the received, filtered and amplified RF signal. The output of the average signal computing module 350 is coupled to the ADC 330.

The mobile sensor node 120 further includes a vibration assessment sensor 355, adapted to detect the activity status of the vehicle 115 carrying the mobile sensor node 120; in detail, the vibration assessment sensor 355 is adapted to analyse the vibrations of the vehicle 115, for example by means of an accelerometer, so as to establish if the vehicle is moving or not. The vibration sensor 355 provides an on/off signal ON/OFF to the μC enable module 315 in accordance with the estimated vibrations of the vehicle 115, so as to enable the turning of the μC 310 on (if the vehicle is moving) or off (if the vehicle is steady).

A power supply 360 supplies the mobile sensor node 120, for example, a battery power supply (e.g., a couple of AAA batteries, as in the fixed sensor node $105_i$); particularly, the power supply 360 supplies the vibration assessment sensor 355 and the WSN unit 305.

Figure 4:
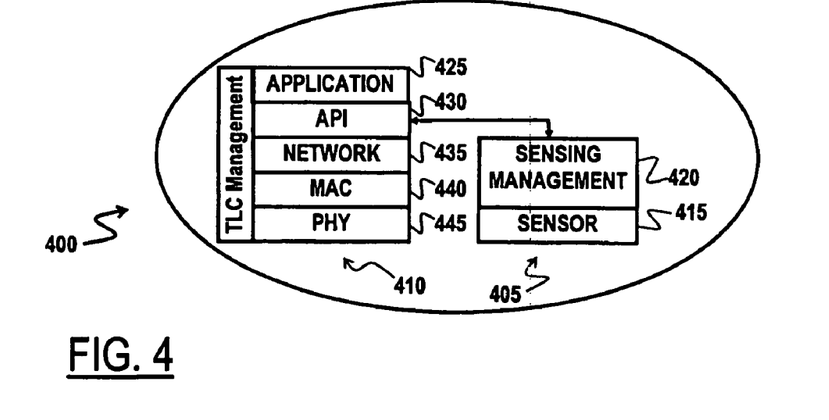
FIG. 4 schematically illustrates a sensor node protocol stack exploited in the sensor nodes of the sensor network of FIG. 1.

FIG. 4 schematically illustrates protocol layer stacks 405 and 410 implemented in a generic fixed sensor node $105_i$, structured according the Open System Interconnection (OSI) architecture. As known to those skilled in the art, the OSI architecture divides functions of a protocol into a series of layers; typically, each layer has the property that it only uses the functions of the layer below, and only exports functionality to the layer above (each layer performs services for the next higher layer and makes requests of the next lower layer). The sensor node $105_1$ is structured in a layered fashion to enable the use of standard tools and to facilitate the design of the WSN from network connections to interoperation with the remote database accessed through an external distribution network.

The protocol layer stack 405 is responsible of the sensing functions, and includes a sensor layer 415 and a sensing management layer 420; the protocol layer stack 405 manages the operation of the speed assessment sensor 255 included in (or coupled to) the respective fixed sensor node $105_i$ for the detection of the speed of vehicles running along the highway.

The protocol layer stack 410 is responsible for managing the telecommunication (TLC) functions, and manages the wireless communication with the other fixed sensor nodes $105_1$ of the WSN 100 and with the mobile sensor node 120. The protocol layer stack 410 includes an application layer 425, an Application Program Interface (API) layer 430 coupled to the sensing management layer 420 of the protocol layer stack 405, a network layer 435, a Media Access Control (MAC) layer 440 and a physical (PHY) layer 445 (that defines all the electrical and physical specifications for the communications).

Figure 5:
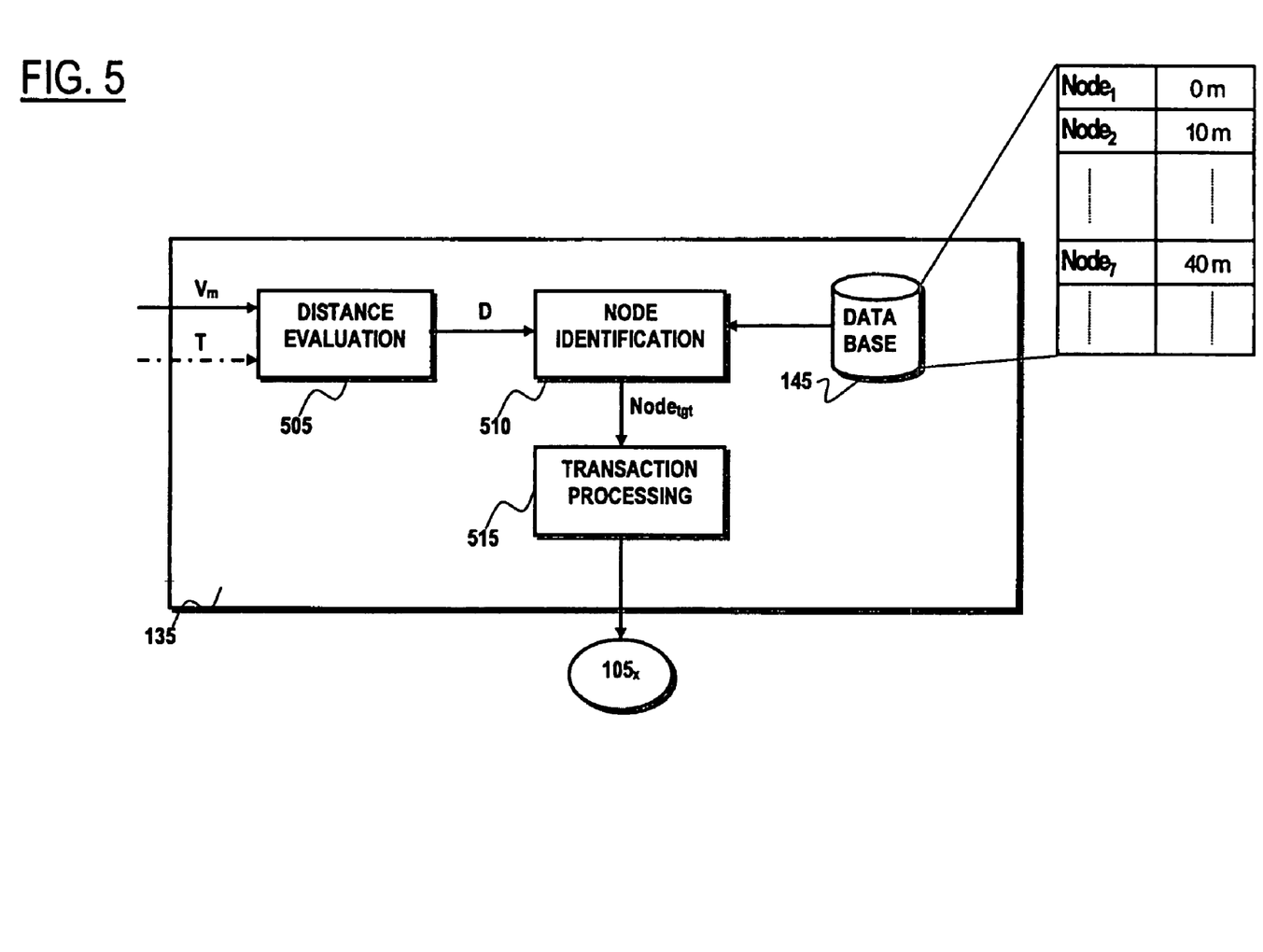
FIG. 5 schematically shows a service center included in the sensor network of FIG. 1, in terms of the functional blocks relevant to the understanding of the invention embodiment to be described.

With reference to FIG. 5, the service center 135 is schematically shown, in terms of the functional blocks relevant to the understanding of the invention embodiment to be described (in FIG. 5 the billing processing 150 is omitted, for the sake of simplicity).

According to an embodiment of the present invention, the service center 135 includes a distance evaluation module 505 adapted to receive from the fixed sensor nodes of the WSN 100, particularly from the fixed sensor node $105_1$, the average speed value $v_m$ of a vehicle, estimated by the speed assessment sensor 255 when the vehicle enters the area covered by the WSN 100. The services offered by the service center 135 may relate to a single type of transaction, or to two or more transaction types; in the former case, the transaction to be carried out in respect of the vehicle entering the area covered by the WSN 100 is known a priori by the service center 135; if instead more than one transaction type is supported, the service center (e.g., the distance evaluation module 505) receives also an indication of the transaction type T, communicated by the mobile sensor node 120 to the fixed sensor node $105_1$.

The distance evaluation module 505, based on indications about the transaction length available to it, estimates a distance D covered by the vehicle 115 during the transaction processing; the estimated distance D is provided to a node identification module 510 of the service center 135. The node identification module 510 has access to the database 145, where the configuration of the WSN 100 is stored; in particular, each node address $Node_1$-$Node_N$, being the network address that identifies a respective fixed sensor node $105_1$-$105_N$, is associated to a respective position indication that indicates the position of that sensor node in the WSN 100, e.g. the position along the highway access ramp 110. For example, the fixed sensor node $105_1$ has position identified by a distance of 0 m, the fixed sensor node $105_2$ by a distance of 10 m from fixed sensor node $105_1$, the fixed sensor node $105_7$ by a distance of 40 m from fixed sensor node $105_1$, etc. In accordance with the information stored in the data base 145 and with the distance D estimated by the distance evaluation module 505, the node identification module 510 is adapted to identify an address $Node_{tgt}$ of the target fixed sensor node $105_x$ which is the sensor node selected for completing the transaction with the mobile sensor node 120.

A transaction processing module 515 of the service center 135 is adapted to process the data required for the transaction and to transmit them to the selected, target fixed sensor node $105_x$.

For estimating the distance D, the distance evaluation module 505 exploits an estimated time duration T of the transaction T to be carried out, an estimated time Δt required for accessing the distribution network 130 and the service center 135, and the estimated speed $v_m$ of the vehicle 115. In detail, supposing that the vehicle 115 moves with uniform rectilinear motion, the estimated distance D is given by $$D = v_m \cdot (T + \Delta t).$$

Based on the estimated distance D that the vehicle covers during the transaction processing, the node identification module 510 is configured to forecast the position of the vehicle 115 at the time the transaction shall be completed, and thus determined the target fixed sensor node $105_x$ in accordance with the respective position along the highway access ramp 110. For example, if the average speed value $v_m$ is of 50 km/h, the time duration T of the given transaction T of 1 second and the time Δt required for accessing the service center 135 of 2 seconds, then:

$$D = \frac{50 \cdot 1000}{3600} \frac{m}{s} \cdot (1 + 2) \text{ s} = 41.7 \text{ m}$$

Under the assumption that the fixed sensor nodes $105_1$-$105_N$ are uniformly space apart from each other by a distance Δx equal to 10 m, then a node distance $D_x$ of the target fixed sensor node $105_x$ from the fixed sensor node $105_1$ is obtained by:

$$D_x = \left[\frac{D}{\Delta x}\right] \Delta x,$$

i.e., the node distance $D_x$ is the integer part of the amount D/Δx multiplied by the distance Δx between two fixed sensor nodes $105_1$-$105_N$. Accordingly, the service center 135 can select the fixed sensor node $105_7$, which has a distance of 40 m from the fixed sensor node $105_1$.

Figure 6:
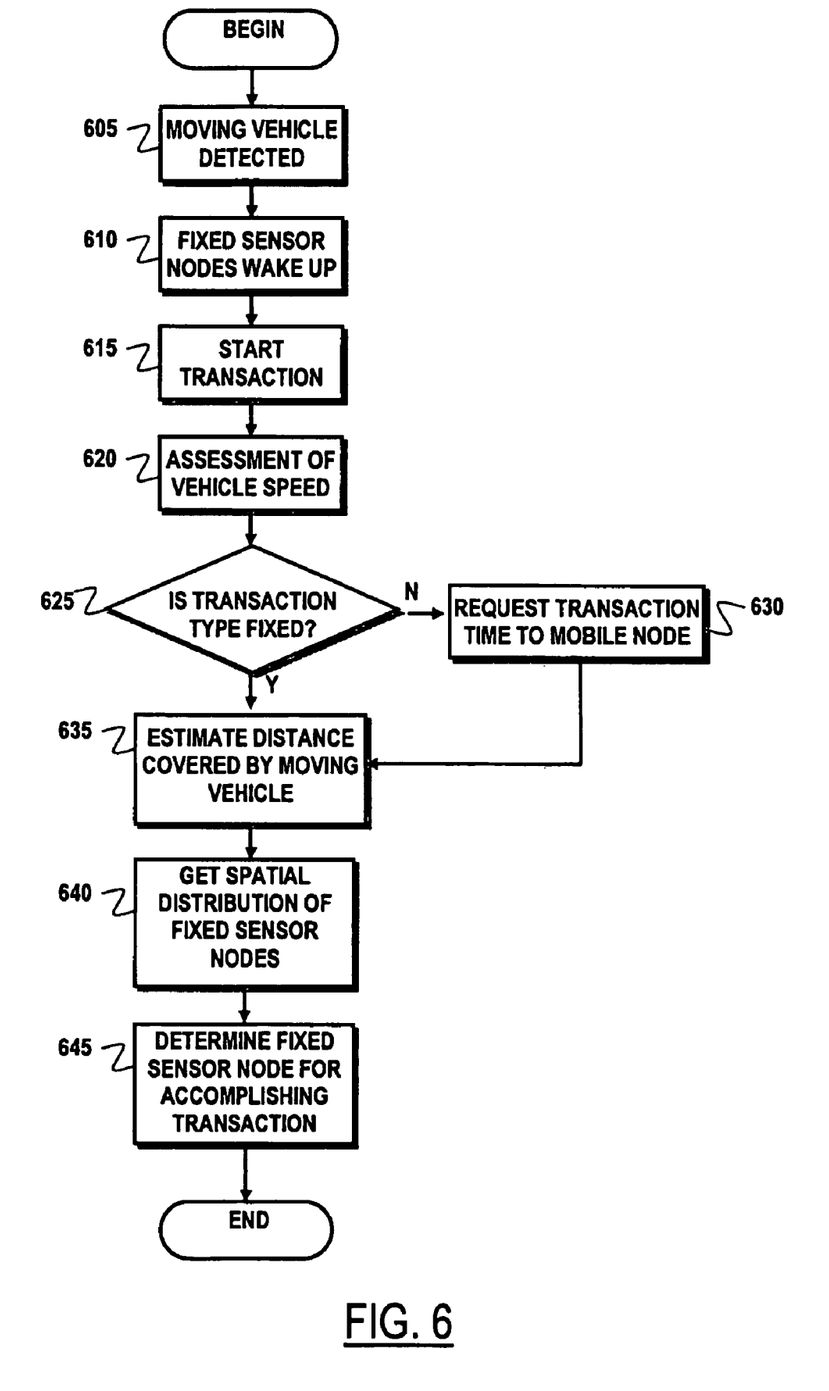
FIG. 6 is a schematic flowchart describing a transaction procedure performed by the sensor network of FIG. 1, according to an embodiment of the present invention.

FIG. 6 is a schematic flowchart describing a transaction procedure, according to an embodiment of the present invention, performed by the WSN 100.

Initially, before the vehicle 115 enters the area of the WSN 100, all the fixed sensor nodes $105_1$-$105_N$ of the WSN 100 and the mobile sensor node 120 are in "sleep mode", i.e. their transceiver 220 and 320 is turned off.

When the vehicle 115, running along the highway 110, enters the area of the WSN 110, the movement of the vehicle 115 is detected by the fixed sensor nodes $105_1$, equipped with the speed assessment sensor 255 and placed at the entrance of the WSN 100 area (block 605). The speed assessment sensor 255 estimates the speed of the vehicle 115, and asserts the wake-up signal WAKE-UP (block 610): the microcontroller 210 is thus woken up.

The microcontroller 210 further receives the indication SPEED of the estimated average vehicle speed value. The microcontroller 210 assesses whether the estimated average vehicle speed exceeds a predetermined speed threshold value: if the average speed value is higher than the threshold speed value, then the fixed sensor node $105_1$ understands that a vehicle is entering the WSN 100 area, and that the whole WSN 100 has to be enabled for a transaction. The transceiver 220 of the fixed sensor node $105_1$ is consequently enabled and starts sending wake-up commands to the other fixed sensor nodes of the WSN 100. In an embodiment of the present invention, the wake-up commands may be in the form of beacon Signals, that the fixed node $105_1$ broadcasts to the other nodes of the WSN 100. The beacon signals that the fixed sensor node $105_1$ broadcasts allows waking-up, enabling both the mobile sensor node 120, carried by the detected vehicle 115, and all the other fixed sensor nodes $105_2$-$105_N$. In fact, the beacon signals are received by the fixed sensor nodes $105_2$ and $105_3$ and the mobile sensor node 120 which are in the radio range of the fixed sensor node $105_1$; the TRX enable modules 225 in the fixed sensor nodes $105_2$ and $105_3$ and 325 in the mobile sensor node 120 assess if the average power of the received beacon signal exceeds a prescribed, minimum threshold value, then the transceivers 220, 320 are enabled. The fixed sensor nodes $105_2$ and $105_3$ that have been woken up, as well as the mobile sensor node 120, starts in turn broadcasting beacon signals, which are received by the fixed sensor nodes in their radio range, still in sleep mode, and these sensor nodes are thus woken up. Then, when the presence of the vehicle 115 wakes up the first fixed node $105_1$ of the WSN 100, a "wake-up" wave of beacon signals is generated, that progressively wakes up all the fixed sensors nodes $105_1$-$105_N$ of the WSN 100 and the mobile sensor node 120.

When the mobile sensor node 120 wakes up, the first fixed sensor node $105_1$ assigns thereto a respective network address and, accordingly, the mobile sensor node 120 is "locked" by the WSN 100.

After the "wake-up" wave is generated, a transaction, such as a toll collection, starts (block 615) and, according to the present invention, in the following steps of the transaction procedure the fixed sensor node $105_1$-$105_N$ that will have to accomplish the transaction is individuated, for example by the service center 135, as described above in connection with FIG. 5.

Then, the fixed sensor node $105_1$ provides to the service center 135 the estimated average speed of the vehicle 115 (block 620); this is done by a multi-hop routing through the fixed sensor nodes $105_2$-$105_6$ to the gateway node 125, and then through the distribution network 130.

If the transaction type is not known a priori (block 625), then the service center 135 receives also this information (if this information is not automatically provided by the mobile node, the service center may request it—block 630). After receiving the indication of the transaction type, the service center 135 determines the corresponding estimated transaction time T (if the transaction type is fixed, the transaction procedure moves directly to the block 635, because the transaction time T is known a priori).

The service center 135 exploits the transaction time T, the access time $\Delta t$ and the estimated average speed value $v_m$ for estimating the distance D covered by the vehicle 115 during the accomplishment of the transaction (block 635). The service center 135 also reads from the database 145 the data regarding the distribution of the fixed nodes in the area covered by the WSN 100 (block 640).

The service center 135 then determines the target fixed sensor node $105_x$ that will have to complete the transaction with the mobile sensor node 120 and transmits thereto the data necessary for completing the transaction, through the distribution network 130, the gateway node 125 and a multi-hop routing accomplished by the other fixed sensor nodes (block 645).

The toll collection is accomplished by charging, for example, a credit card account of the driver of the vehicle 115.

In case the fixed nodes $105_1$-$105_N$ detect an irregularity, such as the entrance into the WSN 100 area of a vehicle without a sensor node, the gateway node 125, an Optical Character Recognition (OCR) system (not shown in the drawing) may be provided for, adapted to detect a number plate of the vehicle. The number plate is then communicated to the service center 135, so as to successively identifying the vehicle owner and taking the necessary steps for billing the toll thereto.

Advantageously, the WSN 100 according to the herein described embodiment of the present invention is able to perform a transaction with a mobile sensor node 120 without the use of any gate, because it is not necessary to have the vehicle slow down and, possibly, stop. In fact, the WSN 100 interacts with the mobile sensor node 120 and accomplishes the transaction despite of the speed of the vehicle 115 within the radio coverage area of the WSN 100. Accordingly, by means of the WSN 100, tollgates typically Installed at entrances and exits of highways and closed parking areas may be eliminated. This allows avoiding the related set-up and maintenance costs, as well as the slowing of the traffic.

Figure 7:
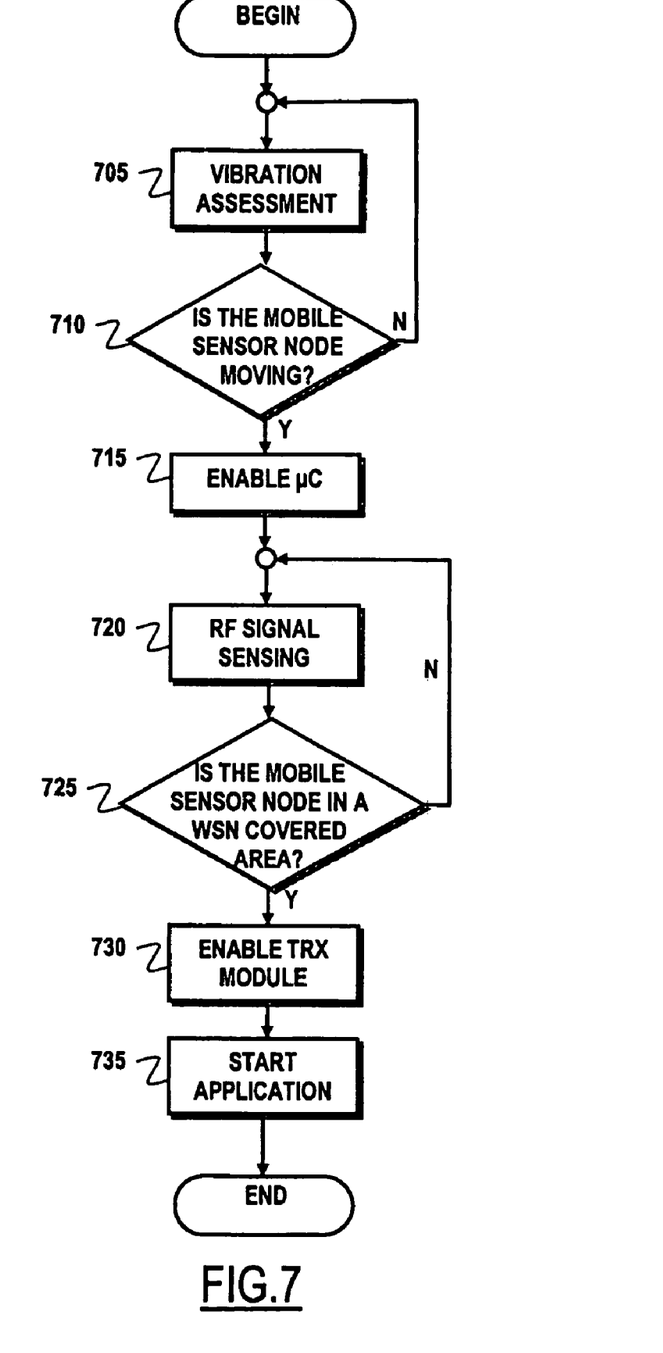
FIG. 7 is a flowchart describing a wake-up mobile node procedure performed by the mobile sensor node of FIG. 3.

In FIG. 7, a flowchart describing a wake-up mobile sensor node procedure is illustrated.

The vibration assessment sensor 355 continuously assess the level of vibrations, and waits for a movement of the vehicle 115 to be detected (block 705, and decision block 710, exit branch N). When a movement is detected (block 710, exit branch Y), then by asserting the on/off signal ON/OFF vibration assessment sensor 355 enables the microcontroller 310 (block 715).

The TRX enable module 325 waits for receiving RF signals from the fixed sensor nodes (block 720); in detail, any detected RF signal is filtered by the pass band filter 340 and amplified by the LNA 345 and, successively, the average signal computing module 350 evaluates its average power value, feeding it to the TRX enable module 325. The TRX enable module 325 assesses whether the average power value of the RF signal is higher than a prescribed minimum threshold, meaning that the mobile sensor node is within an area covered) by a WSN (block 725); in the negative case, the mobile sensor node 120 waits for receiving a valid RF signal, otherwise, if the average power value of the RF signal is higher than the threshold value, the TRX enable module 325 enables the TRX 320 (block 730).

Accordingly, the application necessary for performing the transaction with the service center 135 (described with reference to FIG. 6) is started (block 735).

Figure 8:
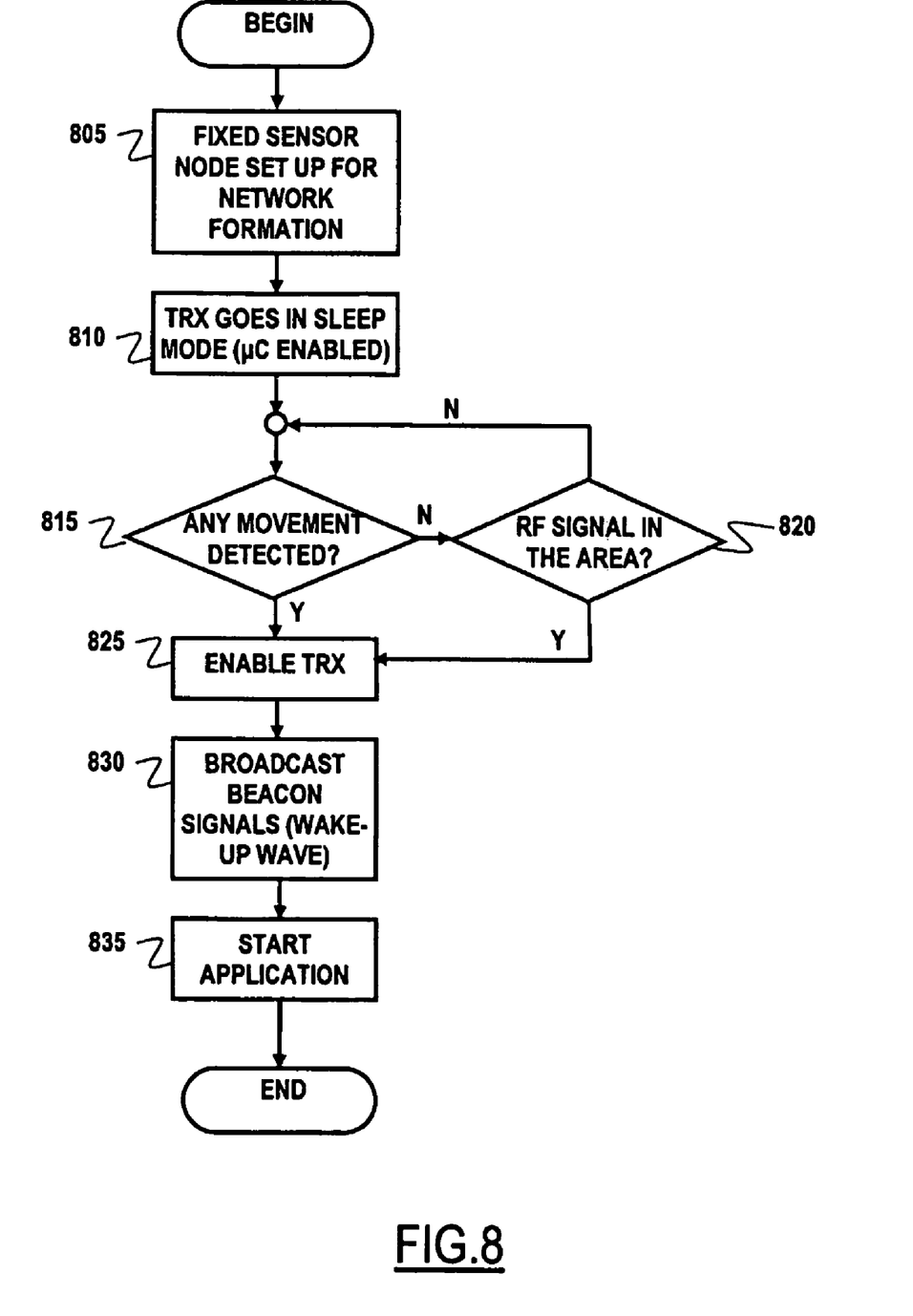
FIG. 8 is a flowchart describing a wake-up fixed node procedure performed by the fixed sensor node of FIG. 2.

FIG. 8 shows a schematic flowchart describing a wake-up fixed sensor node procedure.

Initially, the WSN 100 is formed (after the sensor nodes have been positioned and have been powered up), and each fixed sensor node $105_1$-$105_N$ acquires automatically a respective network address within the WSN 100 (block 805). After the set-up of the WSN 100, the microcontroller 210 of each fixed sensor node $105_i$ puts the sensor node, particularly the transceiver 220 in sleep mode (block 810).

Then, the generic fixed sensor node $105_i$ waits until a movement is detected by the speed assessment sensor 255 (block 815), if the considered sensor node is equipped with or coupled to it, like in the case of the fixed sensor node $105_1$. In case a detected average speed value is lower than a threshold speed value, or in case the fixed sensor node $105_i$ is not equipped with or coupled to the speed assessment sensor 255, the fixed sensor node $105_i$ tests if any RF signal is received (block 820). As described for the mobile sensor node 120, a received RF signal is filtered by the pass band filter 240, amplified by the LNA 245 and, successively, the average signal computing module 250 evaluates its average power value and provides it to the TRX enable module 235. The TRX enable module 235 compares the calculated average power value of the RF signal to a threshold value: if the average power value of the received RF signal is lower than the threshold, the fixed sensor node $105_i$ waits until a moving vehicle is assessed, or a valid RF signal is received. If the average power value of the RF signal exceeds the threshold value, then TRX 220 is enabled (block 825).

After the TRX 220 is enabled, the fixed sensor node $105_i$ starts broadcasting beacon signals (block 830), i.e. it generates or propagates the wake-up wave that wakes up the other fixed sensor nodes $105_i$.

Finally, an application is started (block 835) for performing the transaction with the mobile sensor node 120 on the vehicle 115.

The wake-up procedures according to the described embodiment of the present invention allows greatly reducing a power consumption of the mobile and fixed sensor nodes of the WSN, by enabling the microcontrollers and the transceivers only when required. The microcontroller of the mobile sensor nodes needs to be enabled only when a vehicle carrying it is moving, and the transceiver of the mobile sensor node needs to be enabled only when a RF signal is sensed. Similarly, the microcontroller of the fixed sensor nodes needs to be enabled only when a movement is detected or an RF signal is received. If the mobile and fixed sensor nodes sense an RF signal, then the microcontrollers enable also the transceiver, which in the opposite case are kept turned off. Accordingly, the WSN is energy-efficient, because the microcontrollers and the transceivers are kept off most of the time, and this allows overcoming a problem of power consumption that typically affect sensor networks known in art, especially multi-hop sensor networks, where the nodes act also as routers.

Figure 9:
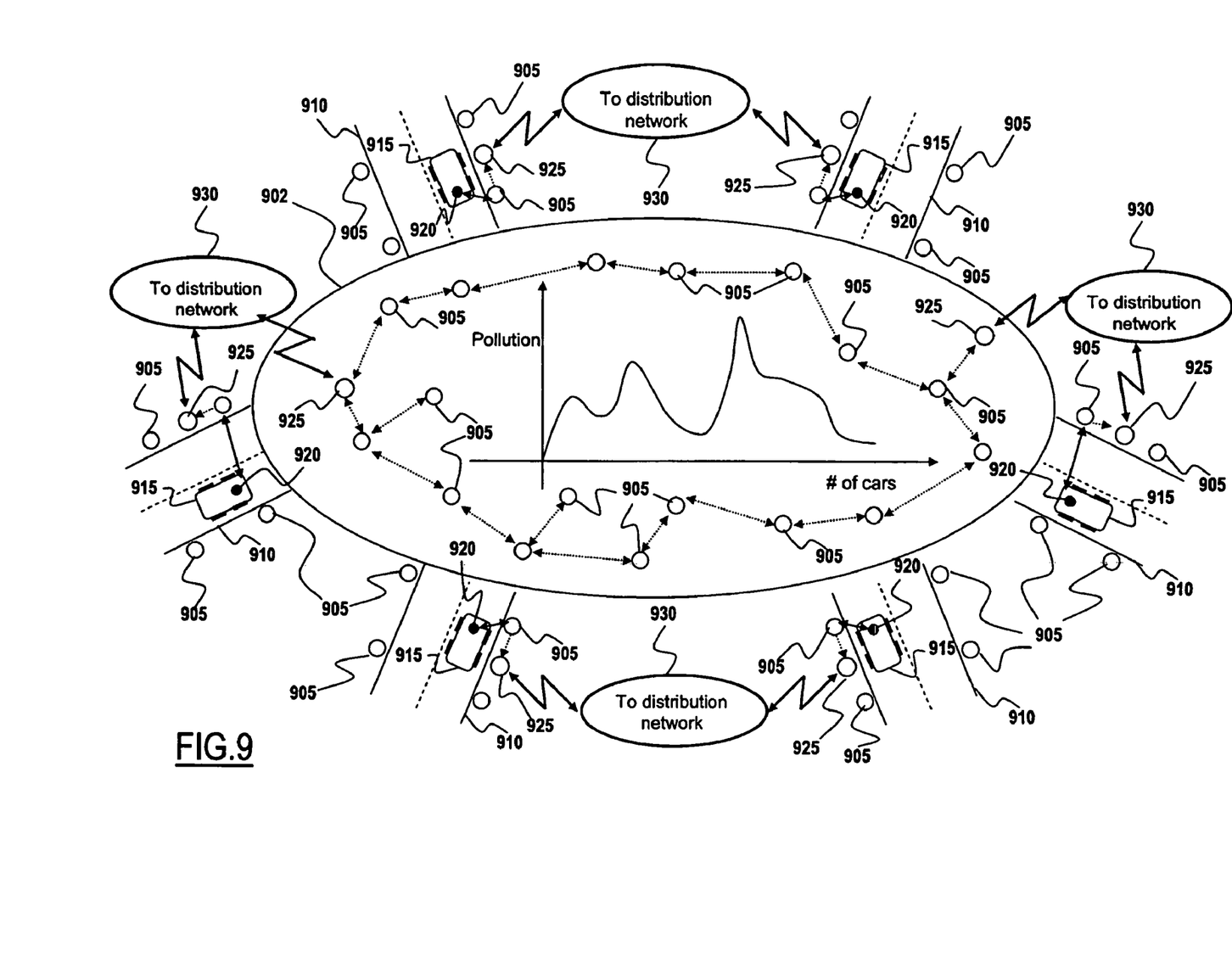
FIG. 9 schematically illustrates a portion of a sensor network numbers according to a further embodiment of the present invention, for pollution monitoring and cross-reference to car.

Considering now FIG. 9, a WSN 900 according to another embodiment of the present invention is shown; particularly, the WSN 900 is exploited for a pollution monitoring and a cross-reference to car numbers, for example, in a urban area 902 (in the drawing, reference numerals like those used in FIG. 1 denote same or similar elements).

The WSN 900 includes a plurality of fixed sensor nodes 905 arranged within the urban area 902 and along a plurality of roads 910 accessing the urban area 902. Vehicles 915 running along the roads 910 and equipped with respective mobile sensor nodes 920, are "locked" by the WSN 900 when they enter in an area covered by the RF signals provided by the fixed sensor nodes 905, in the same way as in the previously described embodiment.

Along each road 910 one fixed sensor node has the additional function of gateway node 925 for communicating with a distribution network 930 in turn coupled to a service center (not shown in the drawing) that is adapted to process the data collected by the fixed sensor nodes 905. Also, within the urban area 902 some fixed sensor nodes operate as gateway nodes 925 for communicating with the distribution network 930.

The WSN 900 allows counting the number of vehicles 915 that are within the urban area 902 and, accordingly, to evaluate the pollution versus the numbers of vehicles 915, as shown in a graph included in FIG. 9. When a vehicle 915 approaches the WSN area, the WSN 900 "locks" the respective mobile sensor node 920. The fixed sensor node 905, detecting the presence the mobile sensor node 920, communicates the information to the nearest gateway node 925, by a multi-hop routing; the gateway node 925 in turn provides the information to the service center through the distribution network 930, for the data processing. In a similar way, the fixed sensor nodes 905 signal to the service center when a vehicle 915 leaves the urban area 902 or when the vehicle 915 stops within the urban area 902, for example, by parking or because it is a car of a resident of the urban area 902.

Although the present invention has been disclosed and described by way of embodiments, it is apparent to those skilled in the art that several modifications to the described embodiments, as well as other embodiments of the present invention are possible without departing from the scope thereof as defined in the appended claims.

For example, the sensor nodes could be compliant to a communication standard different from the described ZigBee™ standard. The area covered by the sensor network might be different from a highway or a urban area, and the mobile sensor nodes are not necessarily mounted on vehicles. The architecture of the mobile and fixed sensor nodes might be different and, particularly, the sensor nodes might include other modules with different functions. The sensor network might also be or include wireline connections between the sensor nodes. The same network can perform a plurality of types of transactions and can be exploited for a number of applications simultaneously. The service center can include more than one data base and more than one transaction processing module; furthermore, the transaction processing module can be included in, or directly coupled to, one of the sensor nodes.

The invention claimed is:

1. A system comprising:
    a plurality of networked nodes spatially distributed within a monitored area and configured to interact with a mobile entity entering and moving through the monitored area, the plurality of nodes comprising at least one area entrance node configured to detect the mobile entity upon entering the monitored area, and a transaction node for accomplishing a transaction with the mobile entity;
    a transaction processing center in communication relationship with the nodes for processing data required for the transaction and for providing the data to the transaction node; and
    a node selection unit configured to dynamically select the transaction node among the plurality of nodes based on an estimation of speed of movement of the mobile entity, wherein the estimation of speed and an estimated transaction time required for processing the data are used to calculate an estimated distance, and the estimated distance is used to select the transaction node.

2. The system of claim 1, wherein said estimation of the speed of movement of the mobile entity is performed upon detecting the mobile entity upon entering the monitored area.

3. The system of claim 1, wherein said node selection unit is configured to dynamically select the transaction node based on a knowledge of a spatial distribution of the nodes within the monitored area.

4. The system of claim 1, wherein at least one node of said plurality of networked nodes is operatively coupled with a sensor.

5. The system of claim 4, wherein the entrance node is operatively coupled to a speed assessment sensor configured to estimate the speed of movement of the mobile entity within the monitored area.

6. The system of claim 1, wherein the node selection unit comprises:
- a transaction time estimation unit configured to estimate the transaction time;
- a distance estimation unit configured to estimate the estimated distance covered by the mobile entity within the monitored area in said transaction time based on the estimated speed of movement; and
- a node identification unit configured to select the transaction node based on the estimated distance and spatial distribution of the nodes.

7. The system of claim 1, wherein the nodes are wireless nodes, each wireless node comprising a wireless transceiver.

8. The system of claim 7, wherein the nodes are configured to route in a multi-hop way, signals received from other nodes.

9. The system of claim 1, wherein the nodes are spatially distributed in respective fixed positions within the area.

10. The system of claim 1, wherein each node is configured to enter a low power consumption state when inoperative.

11. The system of claim 10, wherein the entrance node is configured to wake up from the low power consumption state upon detecting a moving entity entering the monitored area.

12. The system of claim 10, wherein each of said nodes is configured to wake up from the low power consumption state upon receiving a signal from another node or from the mobile entity.

13. The system of claim 1, wherein said mobile entity comprises a networked node of said plurality of networked nodes.

14. The system of claim 13, wherein the mobile entity comprises a vibration sensor configured to activate the mobile entity when vibration is assessed.

15. The system of claim 13, wherein the mobile entity comprises a communication unit configured to wake up when the mobile entity enters the monitored area.

16. A method of operating a network of a plurality of nodes spatially distributed within a monitored area and configured to interact with a mobile entity entering the monitored area to accomplish a transaction, comprising:
- having at least one entrance node, including a microcontroller, of the plurality of nodes, detecting the entrance of the mobile entity in the monitored area;
- estimating a speed of movement of the mobile entity;
- estimating a transaction time required for accomplishing the transaction;
- estimating a distance run by the mobile entity within the monitored area in the estimated transaction time based on the estimated speed of movement; and
- dynamically selecting a transaction node, using a node selection unit, among the plurality of nodes based on the estimated speed and the estimated distance; and
- providing data to the transaction node from a transaction processing center, wherein the transaction processing center is in a communication relationship with the nodes for processing data required for the transaction.

17. The method of claim 16, wherein said dynamically selecting is further based on a knowledge of a spatial distribution of the nodes within the monitored area.

18. The method of claim 16, wherein said estimating the transaction time comprises:
- getting from the mobile entity an indication of a type of transaction to be performed; and
- dynamically estimating the transaction time based on the transaction type indication.

* * * * *